United States Patent
Noviyanto (10) Patent No.: US 11,959,812 B2
(45) Date of Patent: Apr. 16, 2024

(54) AUTOMATED PROGRAMMABLE DEHUMIDIFIER

(71) Applicant: Greencomm Engineering, LLC, Cheyenne, WY (US)

(72) Inventor: Baron Noviyanto, Jakarta (ID)

(73) Assignee: Greencomm Engineering, LLC, Cheyenne, WY (US)

(*) Notice: Subject to any disclaimer, the term of this patent is extended or adjusted under 35 U.S.C. 154(b) by 274 days.

(21) Appl. No.: 17/371,130

(22) Filed: Jul. 9, 2021

(65) Prior Publication Data
US 2023/0009194 A1    Jan. 12, 2023

(51) Int. Cl.
| | |
|---|---|
| *G01K 13/00* | (2021.01) |
| *G05B 13/02* | (2006.01) |
| *G05B 13/04* | (2006.01) |
| *G06F 16/27* | (2019.01) |
| *H04L 67/125* | (2022.01) |

(52) U.S. Cl.
CPC ......... *G01K 13/00* (2013.01); *G05B 13/0265* (2013.01); *G05B 13/048* (2013.01); *G06F 16/27* (2019.01); *H04L 67/125* (2013.01); *G01K 2219/00* (2013.01)

(58) Field of Classification Search
CPC .............. G01K 13/00; G01K 2219/00; G05B 13/0265; G05B 13/048; G06F 16/27; H04L 67/125; H04L 67/10; H04L 67/104; F24F 11/56; F24F 11/86; F24F 2110/10; F24F 2110/20; F24F 11/0008; G06N 20/00
See application file for complete search history.

(56) References Cited

U.S. PATENT DOCUMENTS

| | | | |
|---|---|---|---|
| 6,012,296 A * | 1/2000 | Shah | F24F 3/153 62/176.6 |
| 2022/0221164 A1* | 7/2022 | Reynolds | F24F 3/1405 |

* cited by examiner

*Primary Examiner* — Tejal Gami
(74) *Attorney, Agent, or Firm* — Michael D. Eisenberg (57) ABSTRACT

An example dehumidifier system may include one or more of a processor, an input display unit, a temperature and humidity censor configured to acquire current temperature and relative humidity data, an analog-to-digital transducer configured to convert, the acquired current temperature and relative humidity data from analog to digital output, a psychrometric converter module executed by the processor to convert the relative humidity data into ratio/absolute humidity data, a digital-to-analog transducer configured to convert the ratio/absolute humidity data into an analog format, a hysteresis comparator unit configured to compare hysteresis setpoint data received from the input display unit with data received from the temperature and humidity censor, and a ratio/absolute humidity setpoint comparator unit configured to compare a ratio/absolute humidity setpoint data received from the input display unit with the converted ratio/absolute humidity data.

18 Claims, 7 Drawing Sheets

AUTOMATED PROGRAMMABLE DEHUMIDIFIER

TECHNICAL FIELD

This application generally relates to controlling humidity in the enclosed area, and more particularly, to an automated programmable dehumidifier that uses absolute humidity (AR) settings.

BACKGROUND

Maintaining a correct level of humidity within a living area is very important for health and comfort of occupants. Programming a dehumidifier to the correct humidity level in medical facilities, labs, inside the computer rooms or data centers is even more critical.

Conventional dehumidification systems use relative humidity settings expressed as a percentage (e.g., 50% or 60% humidity). The relative humidity indicates an amount of water vapor present in the air divided by maximum amount of water vapor that the air could contain at that current temperature. The use of relative humidity in the dehumidification systems creates a situation that may not allow for maintaining the correct level of humidity within the enclosed target area. For example, a relative humidity (RH) for the dehumidifier is set at 50%. The dehumidifier may never stop working even if the targeted area humidity is below 50%, because the immediate area surrounding the dehumidifier is at 60% due to some special surrounding conditions such as being placed near a server or a powerful lab lamp, etc. In another example situation, the dehumidifier may never run even if the targeted area already has the humidity level higher than 50%. This may occur because of the immediate area surrounding the dehumidifier is below 50% due to the dehumidifier being located next to some equipment. Thus, the conventional dehumidification systems that use relative humidity settings may waste energy in case of constantly running dehumidifier and may never produce a correct humidity level in case of the dehumidifier that does not work. Furthermore, using dehumidifier setting set by a user may not always produce the most optimal conditions in the enclosed area.

Accordingly, what is needed is a programmable dehumidification system that uses absolute humidity (AH) settings acquired from an artificial intelligence (AI) system.

SUMMARY

An example embodiment provides a dehumidifier system that includes a processor, an input display unit, a temperature and humidity censor configured to acquire current temperature and relative humidity data, an analog-to-digital transducer configured to convert the acquired current temperature and relative humidity data from analog to digital output, a psychrometric converter module executed by the processor to convert the relative humidity data into ratio/absolute humidity data, a digital-to-analog transducer configured to convert the ratio/absolute humidity data into an analog format, a hysteresis comparator unit configured to compare hysteresis setpoint data received from the input display unit with data received from the temperature and humidity censor, and a ratio/absolute humidity setpoint comparator unit configured to compare a ratio/absolute humidity setpoint data received from the input display unit with the converted ratio/absolute humidity data, wherein the ratio/absolute humidity setpoint comparator is configured to send a command to a compressor controller to turn off a compressor in response to a match between the ratio/absolute humidity setpoint data received from the input display and the converted ratio/absolute humidity data.

Another example embodiment provides a method that includes one or more of receiving, by a dehumidifier system, hysteresis setpoint data and ratio/absolute humidity setpoint data from an input display unit; acquiring current temperature and relative humidity data from at least one sensor integrated into the dehumidifier system; converting, by an analog-to-digital transducer, the acquired current temperature and relative humidity data from analog to digital output; converting, by a psychrometric converter module executed by the processor of the dehumidifier system, the relative humidity data into ratio/absolute humidity data based on the current temperature data; converting, by a digital-to-analog transducer, the ratio/absolute humidity data into an analog format; comparing, by a hysteresis comparator unit, the hysteresis setpoint data received from the input display unit with data received from the temperature and humidity censor; comparing, by a ratio/absolute humidity setpoint comparator unit, the ratio/absolute humidity setpoint data received from the input display unit with the converted ratio/absolute humidity data; and sending a command, by the ratio/absolute humidity setpoint comparator unit, to a compressor controller to turn off a compressor in response to a match between the ratio/absolute humidity setpoint data received from the input display and the converted ratio/absolute humidity data.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling r say be depicted in exemplary embodiments, the application is not limited to a certain type of connection, message, and signaling.

Example embodiments provide methods, systems, components, non-transitory computer readable media, devices, and/or networks, which provide for implementation of a programmable dehumidifier that uses AH settings. In one embodiment, the AH settings may be acquired from an artificial intelligence (AI) system based on a current temperature and other parameters of the area that needs to be dehumidified. In one embodiment, the AH settings may be predicted by an AI system model that uses data retrieved from a decentralized storage such as a blockchain.

The decentralized storage may include an append-only immutable data structure resembling a distributed ledger capable of maintaining records between mutually untrusted parties. The untrusted parties are referred to herein as peers or peer nodes. Each peer maintains a copy of the AH and temperature records and no single peer can modify the records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permissionless blockchain, anyone can participate without a specific identity. Public blockchains can involve native cryptocurrency and use consensus based on various protocols such as Proof of Work (PoW). On the other hand, a permissioned blockchain provides secure interactions among a group of entities which share a common goal such as donating and collecting funds for a common charitable cause, but which do not fully trust one another.

Accordingly, the example embodiments provide for a specific solution to a problem in the arts/field of dehumidification. According to the exemplary embodiments, the programmable dehumidifier may use an absolute humidity and/or ratio humidity setting for its operation. Absolute humidity (AH) is a measure of water vapor (moisture) in the air, regardless of temperature. The AH is expressed as grams of moisture per cubic meter of air (g/m3). The maximum absolute humidity of warm air at 30° C./86° F. is approximately 30 g of water vapor—30 g/m3. Ratio humidity (RET) expressed as kg/kg or g/kg. The RH is a ratio of water vapor mass in each air mass. For example, 5 g/kg means there are 5 g of water vapor in each kg of air.

Figure 1A:
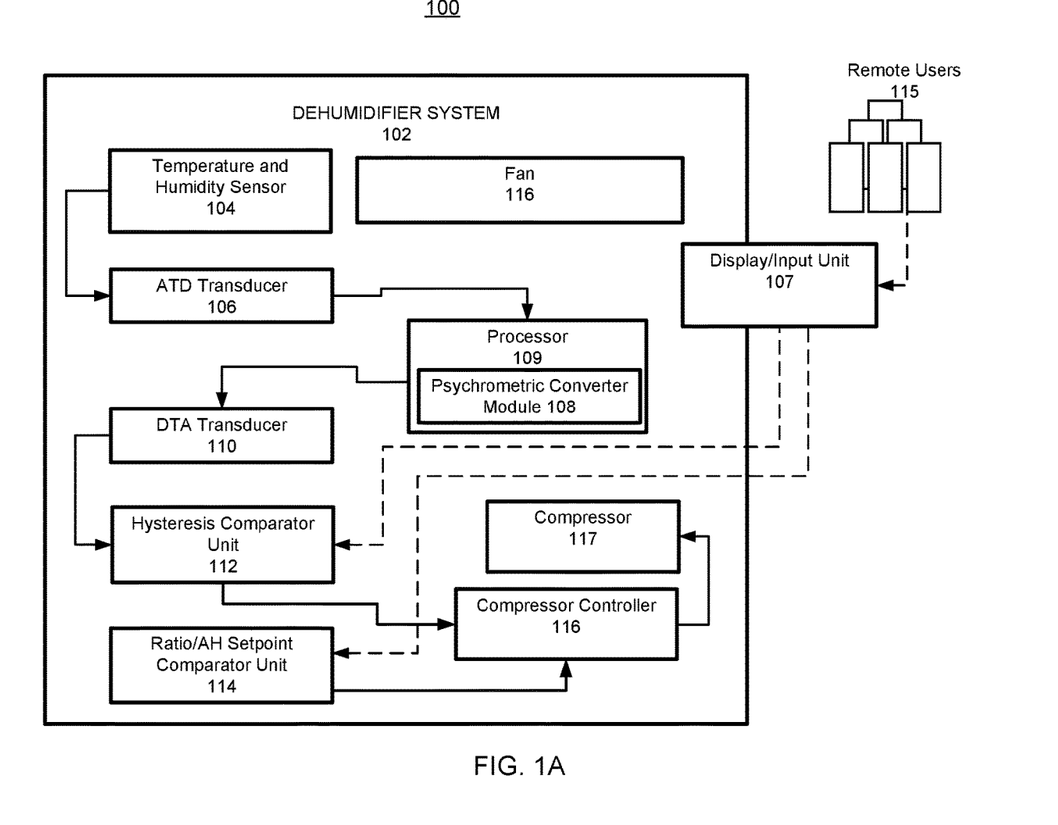
FIG. 1A illustrates a dehumidifier system that uses manual input, according to example embodiments.

FIG. 1A illustrates a dehumidifier system that uses manual input, according to example embodiments.

Referring to FIG. 1A, the example dehumidifier system 102 includes a fan 116 and a processor 109. The processor 109 may be configured to execute a psychrometric converter module 108 configured to convert relative humidity data into ratio/absolute humidity data using an underlying psychrometric chart and current temperature data. The example dehumidifier system 102 may use an integrated input display unit 107 configured to receive user inputs (e.g., hysteresis setpoint and ratio/AH setpoint). A temperature and humidity censor 104 may be configured to acquire current temperature and relative humidity data. This data may be in an analog format. An analog-to-digital transducer (or a regular ADC) 106 may convert the acquired current temperature and relative humidity data from analog to digital output. The relative humidity data may be converted by a psychrometric converter module 108 executed by the processor 109 into ratio/absolute humidity data based on a temperature using an underlying psychrometric chart stored in memory of the dehumidifier system 102.

Then, a digital-to-analog transducer (or a regular DAC) 110 may convert the ratio/absolute humidity data into an analog format. A hysteresis comparator unit 112 may compare hysteresis setpoint data received from the input display unit 107 with the data acquired from the temperature and humidity censor 104. A ratio/absolute humidity setpoint comparator unit 114 may compare a ratio/absolute humidity setpoint data received from the input display unit 107 with the converted ratio/absolute humidity data. Then, the ratio/absolute humidity setpoint comparator 114 may send a command to a compressor controller 116 to turn off a compressor 117 in response to a match between the ratio/absolute humidity setpoint data received from the input display unit 107 and the converted ratio/absolute humidity data. Thus, the dehumidifier system 102, advantageously, operates based on ratio/absolute humidity data, which provides for efficient functionality and energy savings.

Figure 1B:
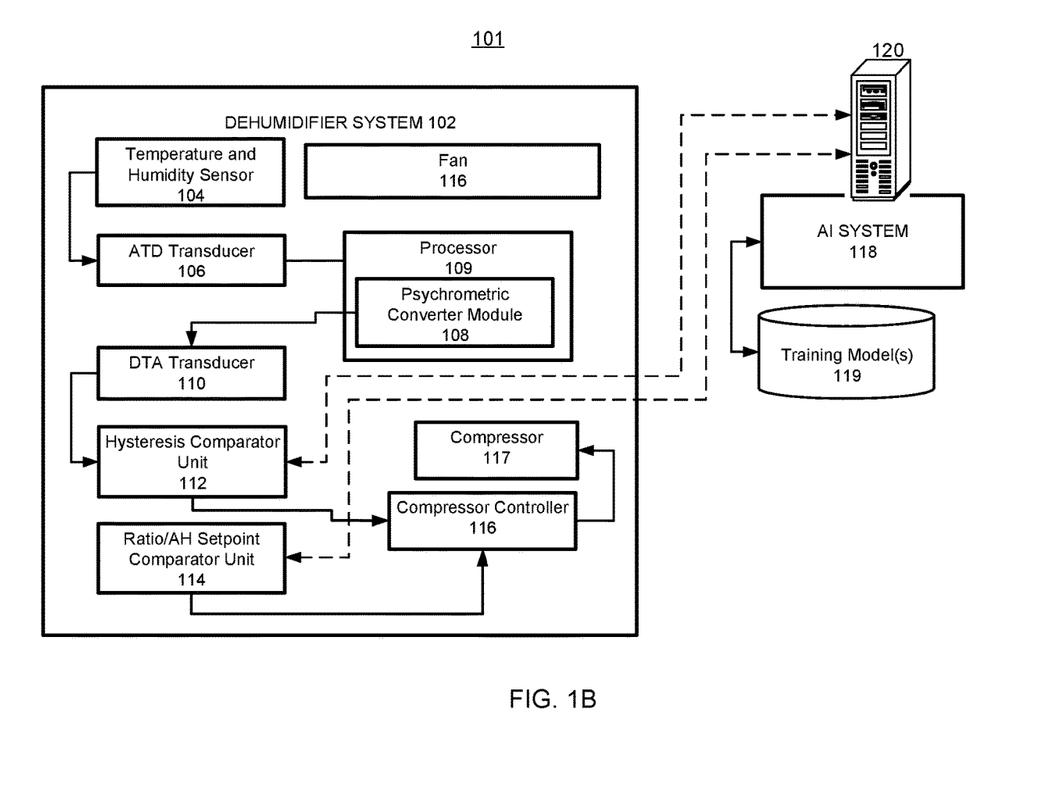
FIG. 1B illustrates a dehumidifier system that uses an input from AI system, according to example embodiments.

FIG. 1B illustrates a dehumidifier system that uses an input from AI system, according to example embodiments.

As discussed above with reference to FIG. 1A, the example dehumidifier system 102 includes a fan 116 and a processor 109. The processor 109 may be configured to execute a psychrometric converter module 108 configured to convert relative humidity data into ratio/absolute humidity data using an underlying psychrometric chart and current temperature data. The example dehumidifier system 102 may use inputs (e.g., hysteresis setpoint and ratio/AB setpoint) provided by an AI system 118 residing on a server node 120 instead of integrated input display unit 107 depicted in FIG. 1A. In one embodiment, the AI system 118 may reside on the dehumidifier system 102 and may be executed by the processor 109. As discussed above, the AH settings may be acquired from an artificial intelligence (AI) system 118 based on a current temperature and other parameters of the area that needs to be dehumidified. In one embodiment, the optimal ratio/AH settings may be predicted by an AI system model 119 that uses data retrieved, for example, from a neural network (not shown) or from another source.

An AI system node 120 may be a computing device or a server computer, or the like, and may include a processor, which may be a semiconductor-based microprocessor, a central processing unit (CPU), an application specific integrated circuit (ASIC), a field-programmable gate array (FPGA), and/or another hardware device. Although a single processor is intended to be used, it should be understood that the AI system node 120 may include multiple processors, multiple cores, or the like, without departing from the scope of the AI system node 120.

The AI system node 120 may also include a non-transitory computer readable medium that may have stored thereon machine-readable instructions executable by the processor to generate a training model(s) 119. Examples of the non-transitory computer readable medium may include an electronic, magnetic, optical, or other physical storage device that contains or stores executable instructions. For example, the non-transitory computer readable medium may be a Random Access Memory (RAM), an Electrically Erasable Programmable Read-Only Memory (EEPROM), a hard disk, an optical disc, or other type of storage device.

A temperature and humidity censor 104 may be configured to acquire current temperature and relative humidity data. This data may be in an analog format. An analog-to-digital transducer (or a regular ADC) 106 may convert the acquired current temperature and relative humidity data from analog to digital output. The relative humidity data may be converted by a psychrometric converter module 108 executed by the processor 109 into ratio/absolute humidity data based on a temperature using an underlying psychrometric chart stored in memory of the dehumidifier system 102.

Then, a digital-to-analog transducer (or a regular DAC) 110 may convert the ratio/absolute humidity data into an analog format. A hysteresis comparator unit 112 may compare hysteresis setpoint data received from the AI system 118 with the data acquired from the temperature and humidity censor 104. A ratio/absolute humidity setpoint comparator unit 114 may compare a ratio/absolute humidity setpoint data received from the AI system 118 with the converted ratio/absolute humidity data. Then, the ratio/absolute humidity setpoint comparator 114 may send a command to a compressor controller 116 to turn off a compressor 117 in response to a match between the ratio/absolute humidity setpoint data received from the AI system 118 and the converted ratio/absolute humidity data. Thus, the dehumidifier system 102, advantageously, operates based on ratio/absolute humidity data using optimal input parameters predicted by the AI system 118, which provides for efficient functionality and energy savings.

Figure 1C:
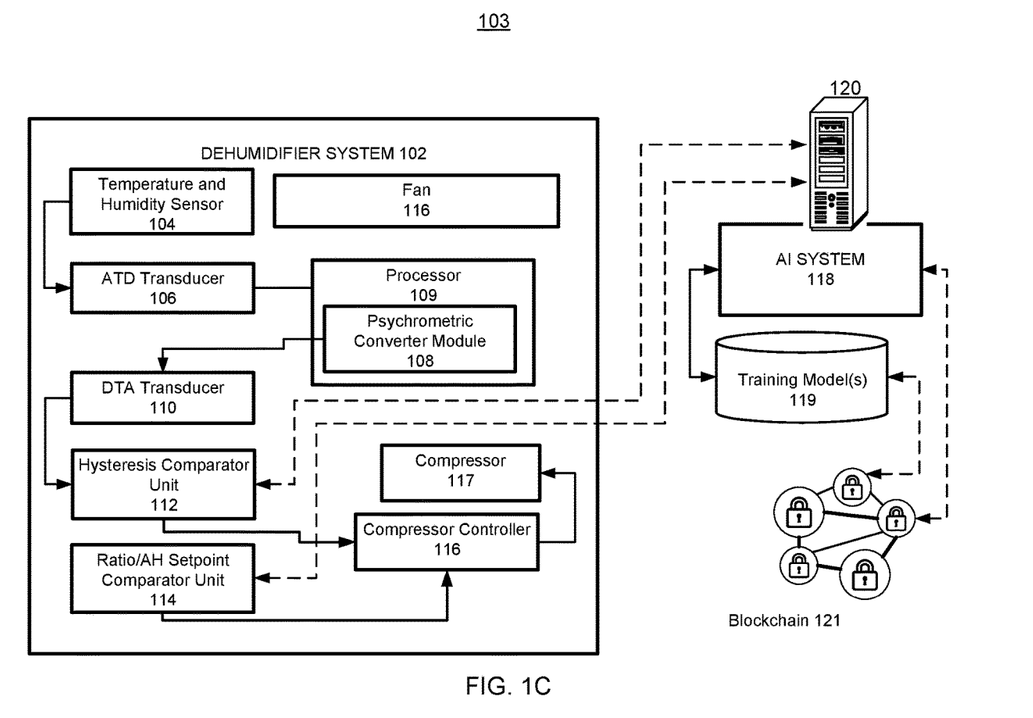
FIG. 1C illustrates a further dehumidifier system that uses an input from AI system based on data retrieved from a blockchain, according to example embodiments.

FIG. 1C illustrates a further dehumidifier system that uses an input from an AI system based on data retrieved from a blockchain 121, according to example embodiments. As discussed above with reference to FIG. 1B, the example dehumidifier system 102 includes a fan 116 and a processor 109. The processor 109 may be configured to execute a psychrometric converter module 108 configured to convert relative humidity data into ratio/absolute humidity data using an underlying psychrometric chart and current temperature data. The example dehumidifier system 102 may use inputs (e.g., hysteresis setpoint and ratio/AH setpoint) provided by the AI system 118 residing on the server node 120. As discussed above, in one embodiment, the AI system 118 may reside on the dehumidifier system 102 and may be executed by the processor 109. The AH/ratio settings may be acquired from the artificial intelligence (AI) system 118 based on a current temperature data and other parameters of the area that needs to be dehumidified. In one embodiment, the optimal ratio/AH settings may be predicted by an AI system model 119 that uses data retrieved, for example, from a neural network (not shown) or from another source such as blockchain 121 discussed in more details herein.

The AI system node 120 may be a computing device or a server computer, or the like, and may include a processor, which may be a semiconductor-based microprocessor, a central processing unit ((PU), an application specific integrated circuit (ASIC), a field-programmable gate array (FPGA), and/or another hardware device. Although a single processor is intended to be used, it should be understood that the AI system node 120 may include multiple processors, multiple cores, or the like, without departing from the scope of the AT system node 120.

The AI system node 120 may also include a non-transitory computer readable medium that may have stored thereon machine-readable instructions executable by the processor to generate a training model(s) 119. Examples of the non-transitory computer readable medium may include an electronic, magnetic, optical, or other physical storage device that contains or stores executable instructions. For example, the non-transitory computer readable medium may be a Random Access Memory (RAM), an Electrically Erasable Programmable Read-Only Memory (EEPROM), a hard disk, an optical disc, or other type of storage device.

The temperature and humidity censor 104 may be configured to acquire current temperature and relative humidity data. This data may be in an analog format. The analog-to-digital transducer (or a regular ADC) 106 may convert the acquired current temperature and relative humidity data from analog to digital output. The relative humidity data may be converted by the psychrometric converter module 108 executed by the processor 109 into ratio/absolute humidity data based on a current temperature using an underlying psychrometric chart stored in memory of the dehumidifier system 102.

Then, the digital-to-analog transducer (or a regular DAC) 110 may convert the ratio/AH data into an analog format. The hysteresis comparator unit 112 may compare hysteresis setpoint data received from the AI system 118 with the data acquired from the temperature and humidity censor 104. A ratio/AH setpoint comparator unit 114 may compare a ratio/AH setpoint data received from the AI system 118 (using training model 119) with the converted ratio/absolute humidity data. Then, the ratio/absolute humidity setpoint comparator 114 may send a command to a compressor controller 116 to turn off a compressor 117 in response to a match between the ratio/absolute humidity setpoint data received from the AI system 118 and the converted ratio/absolute humidity data.

Thus, the dehumidifier system 102, advantageously, operates based on the ratio/absolute humidity data using optimal input parameters predicted by the AI system 118, which provides for efficient functionality and energy savings. As discussed above, the AH settings may be acquired from an artificial intelligence (AI) system 118 based on the current temperature and other parameters of the area that needs to be dehumidified. In one embodiment, the optimal ratio/AH settings may be predicted by an AI system model 119 that uses data retrieved from the blockchain 121.

Figure 2:
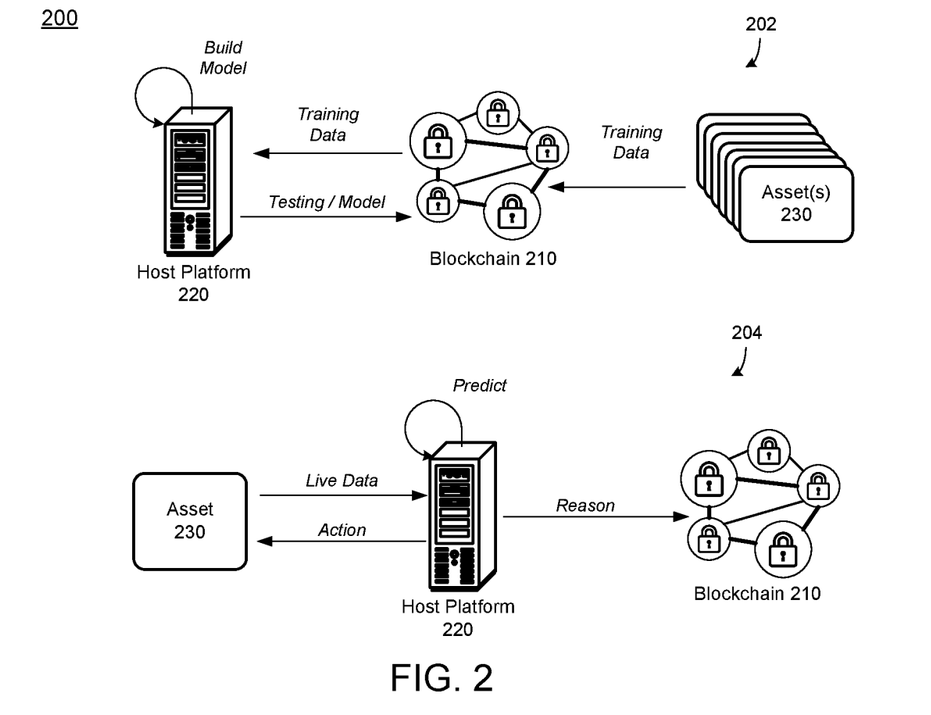
FIG. 2 illustrates an example of a blockchain which stores machine learning AI data, according to example embodiments.

FIG. 2 illustrates an example 200 of a blockchain 210 which stores machine learning (AI) data. Machine learning relies on vast quantities of historical data (or training data) to build predictive models for accurate prediction on new data. Machine learning algorithm may sift through millions of records to unearth non-intuitive patterns based on data retrieved from neural networks or other sources.

In the example depicted in FIG. 2, a host platform 220 builds and deploys a machine learning model for predictive monitoring of assets 230. Here, the host platform 220 may be a cloud platform, an industrial server, a web server, a personal computer, a user device, and the like. Assets 230 can represent AH/ratio data and other dehumidification-related parameters such as temperatures at different points within the enclosed area and the layout of the enclosed area, etc.

The blockchain 210 can be used to significantly improve both a training process 202 of the machine learning model and an AH/ratio predictive process 204 based on a trained machine learning model. For example, in 202, rather than requiring a data scientist/engineer or other user to collect the data, historical data may be stored by the assets 230 themselves (or through an intermediary, not shown) on the blockchain 210. This can significantly reduce the collection time needed by the host platform 220 when performing predictive model training. For example, using smart contracts, data can be directly and reliably transferred straight from its place of origin (e.g., from a sensors) to the blockchain 210. By using the blockchain 210 to ensure the security and ownership of the collected data, smart contracts may directly send the data from the assets to the individuals that use the data for building a machine learning model. This allows for sharing of data among the assets 230.

The collected data may be stored in the blockchain 210 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices (e.g., humidity sensors, thermometers, etc.) which write directly to the blockchain can increase both the frequency and accuracy of the data being recorded.

Furthermore, training of the machine learning model on the collected data may take rounds of refinement and testing by the host platform 220. Each round may be based on additional data or data that was not previously considered to help expand the knowledge of the machine learning model. In 202, the different training and testing steps (and the data associated therewith) may be stored on the blockchain 210 by the host platform 220. Each refinement of the machine learning model (e.g., changes in variables, weights, etc.) may be stored on the blockchain 210. This provides verifiable proof of how the model was trained and what data was used to train the model. Furthermore, when the host platform 220 has achieved a finally trained model, the resulting model data may be stored on the blockchain 210.

After the model has been trained, it may be deployed to a live environment where it can make optimal AH/ratio-related predictions/decisions based on the execution of the final trained machine learning model. In this example, data fed back from the asset 230 may be input into the machine learning model and may be used to make predictions such as optimal parameters and AH/ratio for a particular enclosed area. Determinations made by the execution of the machine learning model at the host platform 220 may be stored on the blockchain 210 to provide auditable/verifiable proof. As one non-limiting example, the machine learning model may predict a AH and temperature to a part of the asset 230. The data behind this decision may be stored by the host platform 220 on the blockchain 210. In one embodiment, the features and/or the actions described and/or depicted herein can occur on or with respect to the blockchain 210.

Figure 3A:
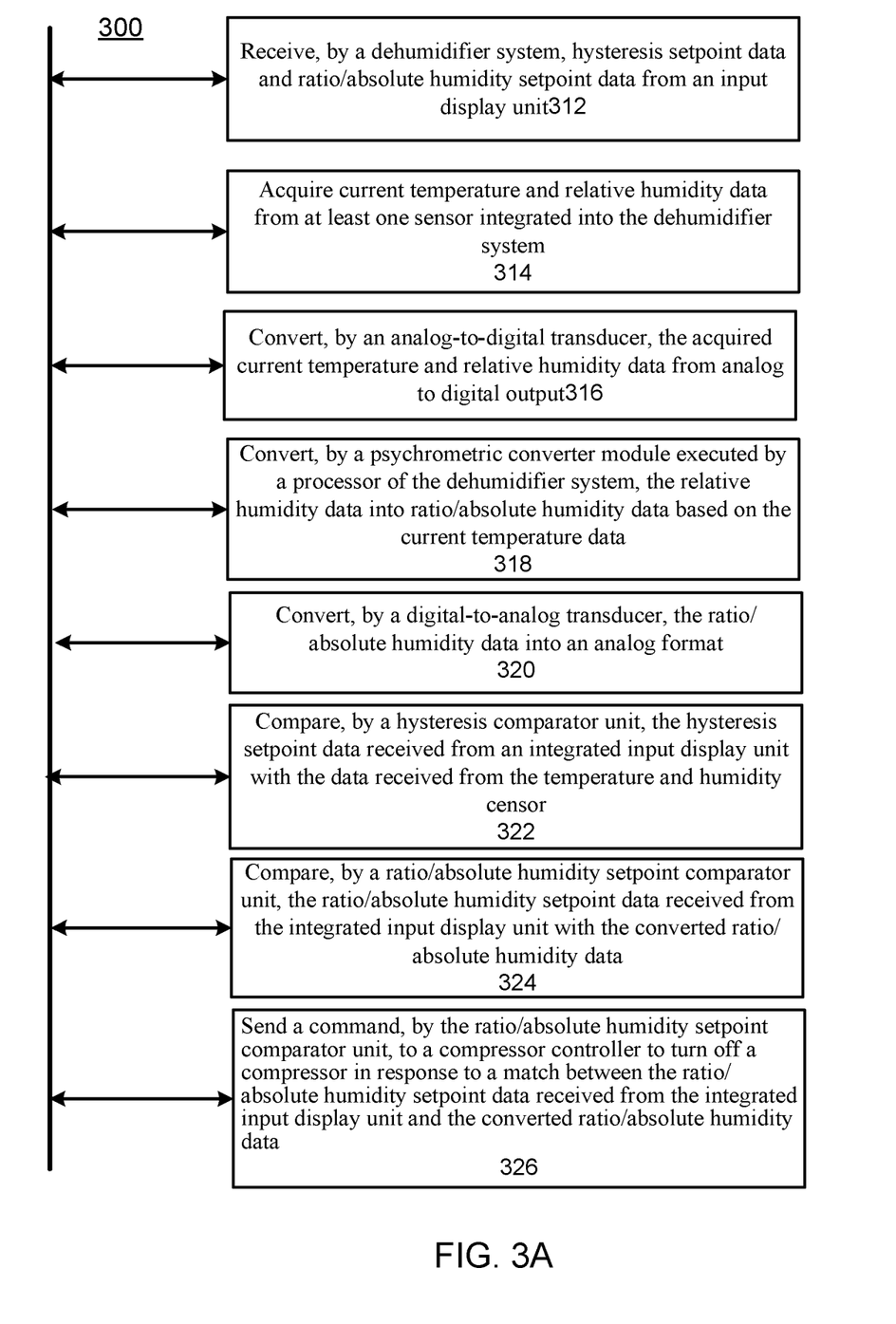
FIG. 3A illustrates a flowchart of a method executed by the dehumidifier system, according to example embodiments.

FIG. 3A illustrates a flowchart of a method executed by the dehumidifier system, according to example embodiments.

It should be understood that method 300 depicted in FIG. 3A may include additional operations and that some of the operations described therein may be removed and/or modified without departing from the scope of the method 300. The description of the method 300 is also made with reference to the features depicted in FIGS. 1A-1C for purposes of illustration. Particularly, the dehumidifier system 102 may execute some or all of the operations included in the method 300.

With reference to FIG. 3A, at block 312, the dehumidifier system 102 may receive hysteresis setpoint data and ratio/absolute humidity setpoint data from an input display unit. At block 314, the dehumidifier system may acquire current temperature and relative humidity data from at least one sensor integrated into the dehumidifier system. At block 316, the dehumidifier system 102 may convert, by an analog-to-digital transducer, the acquired current temperature and relative humidity data from analog to digital output. At block 318, the dehumidifier system 102 may convert, by a psychrometric converter module executed by a processor of the dehumidifier system, the relative humidity data into ratio/absolute humidity data based on the current temperature data. At block 320, the dehumidifier system 102 may convert, by a digital-to-analog transducer, the ratio/absolute humidity data into an analog format. At block 322, the dehumidifier system 102 may compare, by a hysteresis comparator unit, the hysteresis setpoint data received from an integrated input display unit with the data received from the temperature and humidity censor. At block 324, the dehumidifier system 102 may compare, by a ratio/absolute humidity setpoint comparator unit, the ratio/absolute humidity setpoint data received from the integrated input display unit with the converted ratio/absolute humidity data. At block 326, the dehumidifier system 102 may send a command, by the ratio/absolute humidity setpoint comparator unit, to a compressor controller to turn off a compressor in response to a match between the ratio/absolute humidity setpoint data received from the integrated input display unit and the converted ratio/absolute humidity data.

Figure 3B:
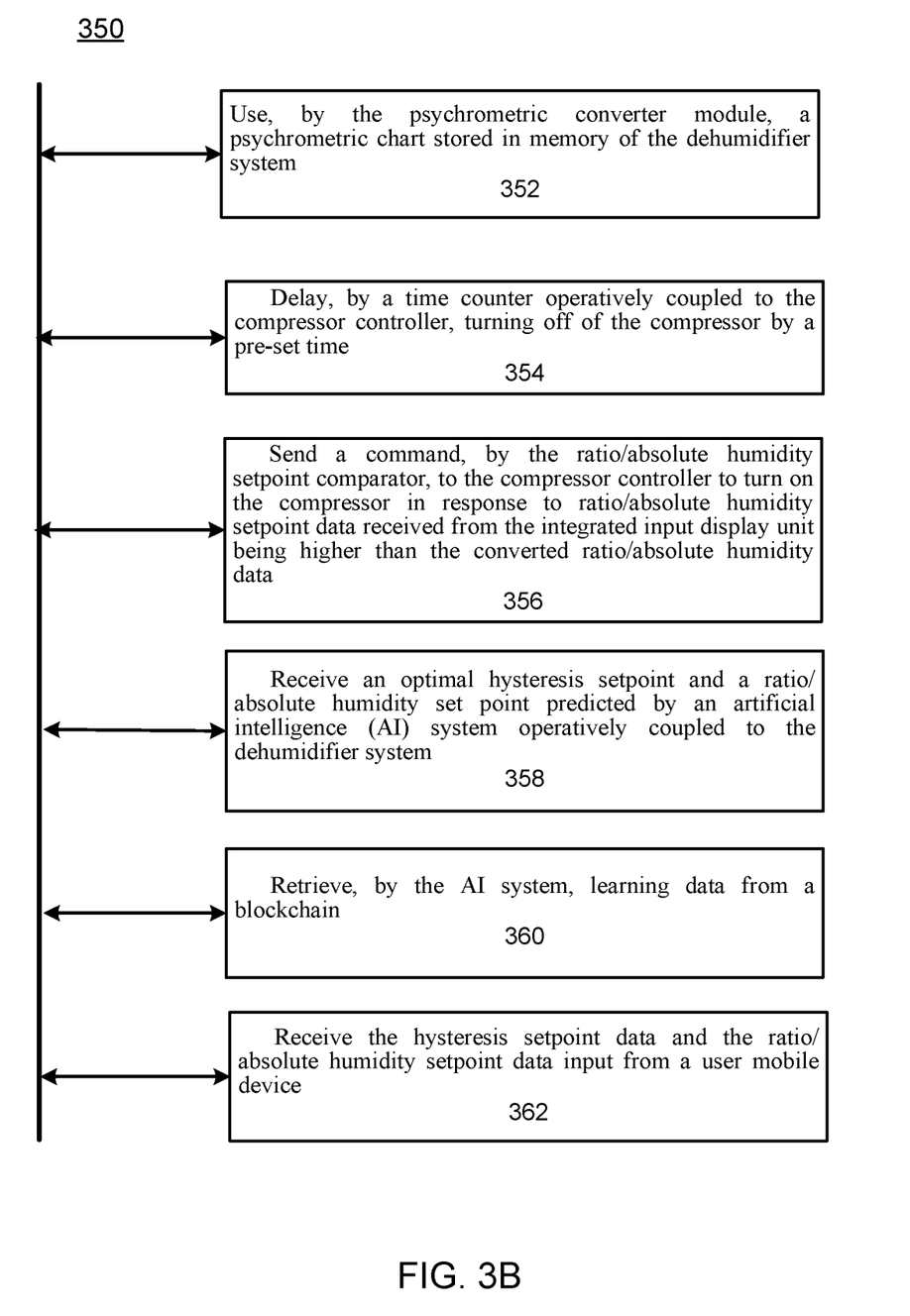
FIG. 3B illustrates a further flowchart of a method executed by the dehumidifier system, according to example embodiments.

FIG. 3B illustrates a further flowchart of a method executed by the dehumidifier system, according to example embodiments.

With reference to FIG. 3B, at block 352, the dehumidifier system 102 may use, by the psychrometric converter module, a psychrometric chart stored in memory of the dehumidifier system. At block 354, the dehumidifier system 102 may delay, by a time counter operatively coupled to the compressor controller, turning off of the compressor by a pre-set time. At block 356, the dehumidifier system 102 may send a command, by the ratio/absolute humidity setpoint comparator, to the compressor controller to turn on the compressor in response to ratio/absolute humidity setpoint data received from the integrated input display unit being higher than the converted ratio/absolute humidity data. At block 358, the dehumidifier system 102 may receive an optimal hysteresis setpoint and a ratio/absolute humidity set point predicted by an artificial intelligence (AI) system operatively coupled to the dehumidifier system. Note that the AI system may run on a remote server connected to the dehumidifier system or may be executed by the processor of the dehumidifier system 102. At block 360, the AI system may retrieve learning data from a blockchain. At block 362, the dehumidifier system 102 may receive the hysteresis setpoint data and the ratio/absolute humidity setpoint data input from a user mobile device.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example computer system/server node 400, which may represent or be integrated in any of the above-described components, etc.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 4:
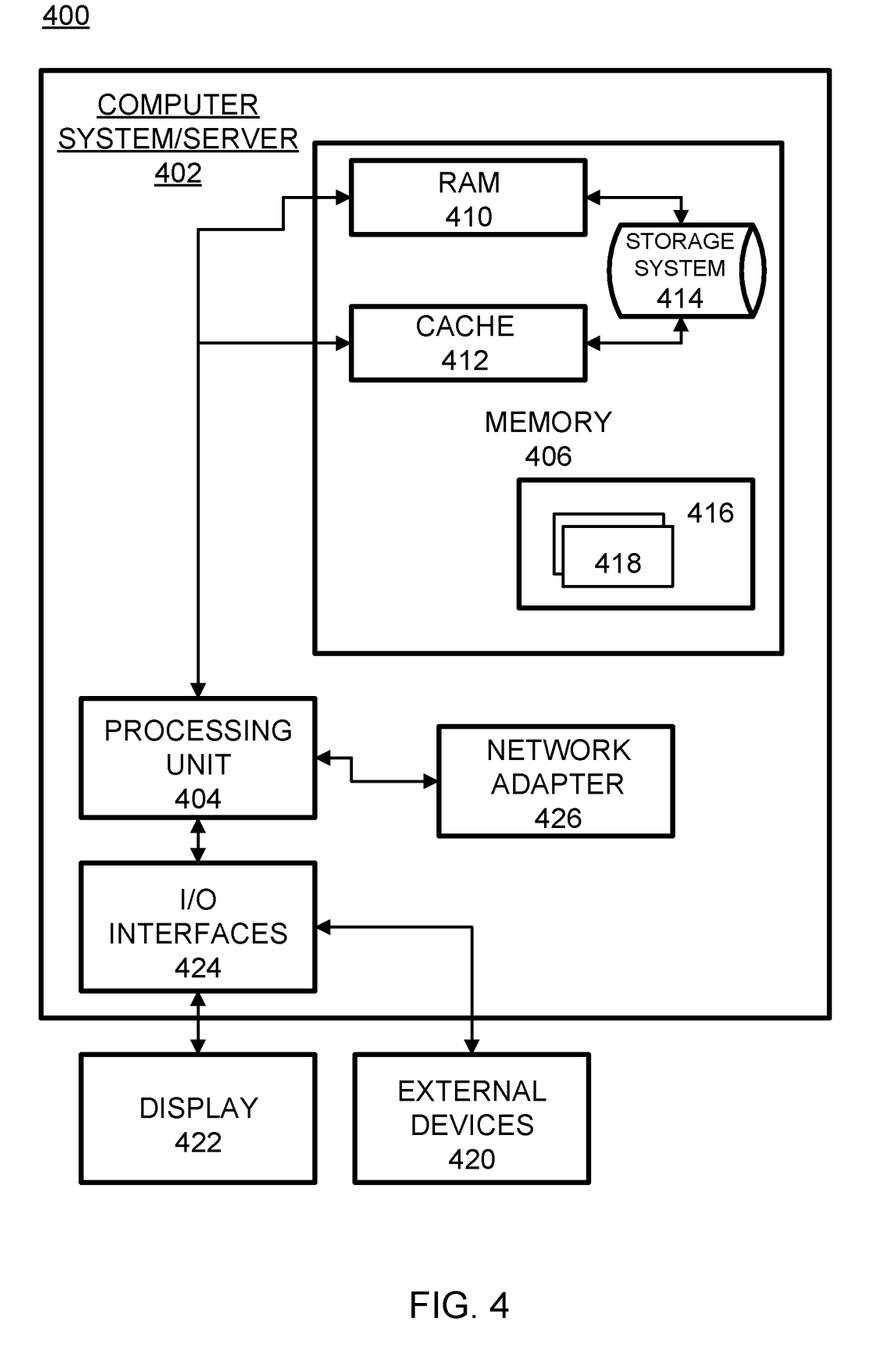
FIG. 4 illustrates an example computer node that supports one or more of the example embodiments.

FIG. 4 illustrates an example AI node 400 that supports one or more of the example embodiments described and/or depicted herein. The AI node 400 comprises a computer system/server 402, which is operational with numerous other general purpose or special purpose computing system environments or configurations. Examples of well-known computing systems, environments, and/or configurations that may be suitable for use with computer system/server 402 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 402 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 402 in the AI node 400 is shown in the form of a general-purpose computing device. The components of computer system/server 402 may include, but are not limited to, one or more processors or processing units 404, a system memory 406, and a bus that couples various system components including system memory 406 to processor 404.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media. System memory 406, in one embodiment, implements the flow diagrams of the other figures. The system memory 406 can include computer system readable media in the form of volatile memory, such as random-access memory (RAM) 410 and/or cache memory 412. Computer system/server 402 may further include other removable/non-removable, volatile/non-volatile computer system storage media. By way of example only, storage system 414 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 416, having a set (at least one) of program modules 418, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. Program modules 418 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 402 may also communicate with one or more external devices 420 such as a keyboard, a pointing device, a display 422, etc.; one or more devices that enable a user to interact with computer system/server 402; and/or any devices (e.g., network card, modem, etc.) that enable computer system/server 402 to communicate with one or more other computing devices. Such communication can occur via 110 interfaces 424. Still yet, computer system/server 402 can communicate with one or more networks such as a local area network (LAN), a general wide area network (WAN), and/or a public network (e.g., the Internet) via network adapter 426. As depicted, network adapter 426 communicates with the other components of computer system/server 402 via a bus. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized, within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A dehumidifier system, comprising:
   a processor;
   an input display unit;
   a temperature and humidity censor configured to acquire current temperature and relative humidity data;
   an analog-to-digital transducer configured to convert the acquired current temperature and relative humidity data from analog to digital output;
   a psychrometric converter module executed by the processor to convert the relative humidity data into ratio/absolute humidity data;
   a digital-to-analog transducer configured to convert the ratio/absolute humidity data into an analog format;
   a hysteresis comparator unit configured to compare hysteresis setpoint data received from the input display unit with data received from the temperature and humidity censor; and
   a ratio/absolute humidity setpoint comparator unit configured to compare the ratio/absolute humidity setpoint data received from the input display unit with the converted ratio/absolute humidity data, wherein, the ratio/absolute humidity setpoint comparator is configured to send a command to a compressor controller to turn off a compressor in response to a match between the ratio/absolute humidity setpoint data received from the input display and the converted ratio/absolute humidity data.

2. The dehumidifier system of claim 1, wherein the psychrometric converter module is configured to use a psychrometric chart stored in memory of the dehumidifier system.

3. The dehumidifier system of claim 1, further comprising a time counter operatively coupled to the compressor controller to delay turning off of the compressor by a pre-set time.

4. The dehumidifier system of claim 1, wherein the ratio/absolute humidity setpoint comparator is configured to send a command to the compressor controller to turn on the compressor in response to ratio/absolute humidity setpoint data received from the input display being higher than the converted ratio/absolute humidity data.

5. The dehumidifier system of claim 1, further comprising an artificial intelligence (AI) system configured to predict optimal hysteresis setpoint and ratio/absolute humidity set point to be used as an input of the dehumidifier system.

6. The dehumidifier system of claim 5, wherein the AI system runs on a remote server connected to the dehumidifier system.

7. The dehumidifier system of claim 5, wherein the AI system is executed by the processor of the dehumidifier system.

8. The dehumidifier system of claim 5, wherein the AI system is configured to retrieve learning data from a blockchain.

9. The dehumidifier system of claim 1, wherein the hysteresis setpoint data and the ratio/absolute humidity setpoint data input is provided by remote user devices.

10. A method, comprising:
  receiving, by a dehumidifier system, hysteresis setpoint data and ratio/absolute humidity setpoint data from an input display unit;
  acquiring current temperature and relative humidity data from at least one sensor integrated into the dehumidifier system;
  converting, by an analog-to-digital transducer, the acquired current temperature and relative humidity data from analog to digital output;
  converting, by a psychrometric converter module executed by a processor of the dehumidifier system, the relative humidity data into ratio/absolute humidity data based on the current temperature data;
  converting, by a digital-to-analog transducer e ratio/absolute humidity data into an analog format;
  comparing, by a hysteresis comparator unit, the hysteresis setpoint data received from an integrated input display unit with the data received from the temperature and humidity censor;
  comparing, by a ratio/absolute humidity setpoint comparator unit, the ratio/absolute humidity setpoint data received from the integrated input display unit with the converted ratio/absolute humidity data; and
  sending a command, by the ratio/absolute humidity setpoint comparator unit, to a compressor controller to turn off a compressor in response to a match between the ratio/absolute humidity setpoint data received from the integrated input display unit and the converted ratio/absolute humidity data.

11. The method of claim 10, further comprising using, by the psychrometric converter module, a psychrometric chart stored in memory of the dehumidifier system.

12. The method of claim 10, further comprising delaying, by a time counter operatively coupled to the compressor controller, turning off of the compressor by a pre-set time.

13. The method of claim 10, further comprising sending a command, by the ratio/absolute humidity setpoint comparator, to the compressor controller to turn on the compressor in response to ratio/absolute humidity setpoint data received from the integrated input display unit being higher than the converted ratio/absolute humidity data.

14. The method of claim 10, further comprising receiving, by the dehumidifier system, an optimal hysteresis setpoint and a ratio/absolute humidity set point predicted by an artificial intelligence (AI) system operatively coupled to the dehumidifier system.

15. The method of claim 14, wherein the AI system runs on a remote server connected to the dehumidifier system.

16. The method of claim 14, wherein the AI system is executed by the processor of the dehumidifier system.

17. The method of claim 14, further comprising, retrieving, by the AI system, learning data from a blockchain.

18. The method of claim 10, further comprising receiving, by the dehumidifier system, the hysteresis setpoint data and the ratio/absolute humidity setpoint data input from a user mobile device.

* * * * *